(12) United States Patent
Bourgeat et al.

(10) Patent No.: US 11,016,200 B2
(45) Date of Patent: May 25, 2021

(54) SIGNAL RECEIVING STATION FOR AN ADS-B SURVEILLANCE SYSTEM

(71) Applicant: DIRECTION DES SERVICES DE LA NAVIGATION AÉRIENNE, Paris (FR)

(72) Inventors: Eric Bourgeat, Saint Cyr au Mont d'Or (FR); Julien Ducroux, Nochize (FR)

(73) Assignee: DIRECTION DES SERVICES DE LA NAVIGATION AÉRIENNE, Paris (FR)

( * ) Notice: Subject to any disclaimer, the term of this patent is extended or adjusted under 35 U.S.C. 154(b) by 115 days.

(21) Appl. No.: 15/777,505

(22) PCT Filed: Nov. 18, 2016

(86) PCT No.: PCT/FR2016/053014
§ 371 (c)(1),
(2) Date: May 18, 2018

(87) PCT Pub. No.: WO2017/085426
PCT Pub. Date: May 26, 2017

(65) Prior Publication Data
US 2018/0329074 A1    Nov. 15, 2018

(30) Foreign Application Priority Data

Nov. 19, 2015 (FR) ..................... 1561122

(51) Int. Cl.
*G01S 19/35* (2010.01)
*G01S 19/13* (2010.01)
(Continued)

(52) U.S. Cl.
CPC ............... *G01S 19/35* (2013.01); *G01S 19/13* (2013.01); *G01S 19/37* (2013.01); *G08G 5/0013* (2013.01);
(Continued)

(58) Field of Classification Search
CPC .......... G01S 19/35; G01S 19/13; G01S 19/36; G01S 19/37; G08G 5/0013; G08G 5/0026; G08G 5/0082; H01Q 1/1228; H01Q 1/48
(Continued)

(56) References Cited

U.S. PATENT DOCUMENTS 3,299,429 A * 1/1967 McMullin ............ H01Q 1/1228
343/796
6,064,335 A    5/2000 Eschenbach
(Continued)

FOREIGN PATENT DOCUMENTS

EP    2 296 128 A1    3/2011

OTHER PUBLICATIONS

International Search Report, dated Feb. 16, 2017, from corresponding PCT application No. PCT/FR2016/053014.

*Primary Examiner* — Chuong P Nguyen
(74) *Attorney, Agent, or Firm* — Nixon & Vanderhye (57) ABSTRACT

A signal receiving station for an ADS-B surveillance system used in air traffic control includes a housing to be attached to a mast. The housing includes an ADS-B signal receiving antenna, a GPS signal receiving antenna, and an electronic module for receiving and processing ADS-B signals and GPS signals. The ADS-B signal receiving antenna and GPS signal receiving antenna are connected to the electronic receiving and processing module inside the housing.

16 Claims, 5 Drawing Sheets

(51) Int. Cl.
*G01S 19/37* (2010.01)
*G08G 5/00* (2006.01)
*H01Q 1/12* (2006.01)
*H01Q 1/48* (2006.01)

(52) U.S. Cl.
CPC ......... *G08G 5/0026* (2013.01); *G08G 5/0082* (2013.01); *H01Q 1/1228* (2013.01); *H01Q 1/48* (2013.01)

(58) Field of Classification Search
USPC ............. 342/357.75, 357.51, 357.76, 357.77
See application file for complete search history.

(56) References Cited

U.S. PATENT DOCUMENTS

| | | | | |
|---|---|---|---|---|
| 6,995,689 B2* | 2/2006 | Crank | ................ | B64D 45/0015 340/970 |
| 7,158,053 B2* | 1/2007 | Crank | ................ | B64D 45/0015 340/963 |
| 7,436,322 B2* | 10/2008 | Crank | ................ | B64D 45/0015 340/945 |
| 7,702,461 B2* | 4/2010 | Conner | ................... | G01S 19/15 340/945 |
| 8,072,374 B2* | 12/2011 | Hovey | ..................... | G08G 5/04 342/357.31 |
| 8,386,175 B2* | 2/2013 | Limbaugh | ............ | G08G 5/0013 340/961 |
| 9,893,413 B2* | 2/2018 | Johnson | ................... | H01Q 21/28 |
| 10,101,447 B2* | 10/2018 | Schulte | .................. | G01S 13/74 |
| 10,171,999 B2* | 1/2019 | Phillips | .............. | H04N 5/23241 |
| 10,467,909 B2* | 11/2019 | DeBusk | ................. | G01S 1/0428 |
| 10,641,886 B2* | 5/2020 | Bilek | .................. | H04B 7/0491 |
| 2009/0146875 A1* | 6/2009 | Hovey | ..................... | G08G 5/04 342/357.31 |
| 2010/0283661 A1* | 11/2010 | Strain | ................... | G01S 5/0072 342/30 |

\* cited by examiner

SIGNAL RECEIVING STATION FOR AN ADS-B SURVEILLANCE SYSTEM

The present invention relates to a signal receiving station for an ADS-B surveillance system.

BACKGROUND OF THE INVENTION

The present invention relates generally to air traffic control implementing a cooperative surveillance system, via an Automatic Dependent Surveillance Broadcast system.

Implementing an ADS-B surveillance system for air traffic control is becoming more widespread, in particular in the regions of the world where radar equipment is absent or provision is inadequate.

In principle, ADS-B surveillance makes it possible to find the position of aircraft by using calculation means with which each aircraft is equipped.

Each aircraft determines its position by using the existing positioning system by satellites of the GPS type or by an inertial unit, then regularly sends the thus-determined position by radio link, as well as other elements of information that are useful in air traffic control such as items of information on altitude, speed and route. A ground station is suitable for receiving and processing the ADS-B signals thus broadcast by each aircraft.

Thus by way of example, EP 2 296 128 discloses an air traffic control system implementing an ADS-B surveillance system.

In such a system, several ground stations are envisaged, preferably at a distance from one another.

More specifically, the ADS-B signals are received by an antenna.

Generally, the antenna for receiving ADS-B signals is omnidirectional and placed at the top of a mast (or pylon).

The masts of the receiving stations are generally very high, of the order of 20 to 30 m, and require the antenna to be linked by a coaxial cable to the ground station placed at the base of the mast.

Attenuation of the signals transmitted by the coaxial cable is significant. It may correspond to a signal/noise ratio of 3 dB and negatively affects good reception of the ADS-B signals and thus the effective reach of the antenna.

The purpose of the present invention is to improve a signal receiving station for an ADS-B surveillance system.

SUMMARY OF THE INVENTION

To this end, the present invention relates to a signal receiving station for an ADS-B surveillance system implemented within an air traffic control system.

According to the invention, the receiving station comprises a housing intended to be fastened to a mast, the housing comprising an antenna for receiving ADS-B signals, an antenna for receiving GPS signals and an electronic module for receiving and processing ADS-B signals and GPS signals, the antennas for receiving ADS-B signals and GPS signals being connected inside the housing to said receiving and processing electronic module.

Thus, the antenna for receiving ADS-B signals and the antenna for receiving GPS signals are installed together, with the electronic module for receiving and processing ADS-B signals and GPS signals, inside the housing intended to be placed at the top of the mast.

The receiving station thus makes it possible to dispense with the coaxial transmission cables between each antenna and a signal receiving device placed at the base of the mast.

Thus a better signal-to-noise ratio is obtained, improving the reception and processing of the ADS-B signal.

Furthermore, the connection inside a housing of each antenna to the electronic module for the reception and processing of the signals avoids tedious configurations of the system in order to take account of both the coaxial cable lengths and the distance separating the antenna for receiving GPS signals and the antenna for receiving ADS-B signals.

Installing the antenna for receiving GPS signals together, with the antenna for receiving ADS-B signals, in one and the same housing makes it possible to date each reception event of an ADS-B signal at the exact reception location thereof.

Installing the antennas for receiving GPS signals and ADS-B signals together is thus particularly advantageous for performing calculations for positioning an aircraft by multilateration.

In fact, installing the antennas for receiving GPS signals and ADS-B signals together and elimination of coaxial transmission cables between each antenna and the electronic receiving and processing module removes the risks of error when performing calculations by multilateration, from various signal receiving stations, in order to determine the position of an aircraft by multilateration.

By way of a practical example, the electronic module for receiving and processing signals comprises calculation means suitable for dating the ADS-B signals received and/or to verify the geographical position of said antenna for receiving ADS-B signals from the GPS signals received.

In a configuration making it possible to integrate the functionalities of a ground station in the housing fastened to a mast, the electronic receiving and processing module comprises means for generating messages according to the ASTERIX category 21 exchange standard.

According to an advantageous embodiment of the invention, the electronic receiving and processing module is incorporated into a case removably fastened inside the housing.

Thus, although placed in a housing intended to be fastened at the top of a mast, the electronic receiving and processing module can be removed in the event of breakdown or desired replacement of the electronic module.

In practice, the case comprises two connectors suitable for being connected to a coaxial output of the antenna for receiving ADS-B signals and to a coaxial output of the antenna for receiving GPS signals, respectively.

Similarly, the case preferably comprises a connector for a network cable suitable for connecting the electronic receiving and processing module to a remote signal processing station.

Thus, processing the ADS-B signals received can be partially carried out by the integrated electronic receiving and processing module in the housing with the antenna for receiving ADS-B signals, and partially carried out by a remote signal processing station for their exploitation in the ADS-B surveillance system.

In a practical embodiment of the invention, the housing comprises two parts, a first part being intended to be fastened to a mast and a second part being removably fastened to the first part, the case being accessible in the housing when this second part of the housing is removed from the first part of the housing.

In an advantageous configuration, the first part of the housing comprises a female screw thread suitable for engaging with a male screw thread mounted freely rotatable on the case and mounted fixed in translation in a longitudinal direction of the case and of the first part of the housing.

It is thus possible to fasten the case in the first part of the housing while causing a translational movement of the case into the housing in the longitudinal direction of these elements.

The connection inside the housing of the case to the antennas for receiving ADS-B signals and for receiving GPS signals can thus be made by plugging the coaxial outputs of the antennas into the connectors of the case.

In an embodiment, the antenna for receiving ADS-B signals is mounted in the centre of a ground plane incorporated in the housing.

Using a ground plane advantageously makes it possible to improve the operation and the reception of the ADS-B signals by the antenna, and thus the effective range of the antenna for receiving ADS-B signals.

In practice, the antenna for receiving GPS signals is fastened onto the ground plane.

This arrangement makes it possible to provide a reliable positioning of the antenna for receiving the GPS signals with respect to the antenna for receiving the ADS-B signals.

Preferably, the antenna for receiving GPS signals is mounted at the periphery of the ground plane in order to ensure that it does not detract from the homogeneity of the ground plane and disturb reception of the ADS-B signals.

Other features and advantages of the invention will become more apparent in the following description.

BRIEF DESCRIPTION OF THE DRAWINGS

In the attached drawings, given by way of non-limitative example.

DETAILED DESCRIPTION OF THE PREFERRED EMBODIMENTS

Firstly, a description will be given with reference to FIG. 1 of a signal receiving station for an ADS-B surveillance system implemented in air traffic control according to an embodiment of the invention.

The purpose of such a signal receiving station is to receive ADS-B signals originating from one or more aircraft.

In a cooperative surveillance system of the ADS-B type, items of aircraft positioning information are generated directly on each aircraft, equipped with a satellite (or inertial unit) positioning system.

Thus, the aircraft calculates its own position and sends it regularly by radio.

In the ADS-B surveillance system, the signal receiving station is a passive station suitable for continuously receiving the signals broadcast by the aircraft, without requiring a dedicated connection to be established between each aircraft and the signal receiving station.

ADS-B signals are signals with a frequency equal to 1090 Mhz, which can be transmitted by the Mode S radar transponders with which commercial aircraft are generally equipped.

Such a signal receiving station is provided for equipping, non-limitatively, airports in areas which are not equipped with radar.

In principle, a signal receiving station comprises mainly an antenna for receiving ADS-B signals, intended to be positioned at height.

Figure 1:
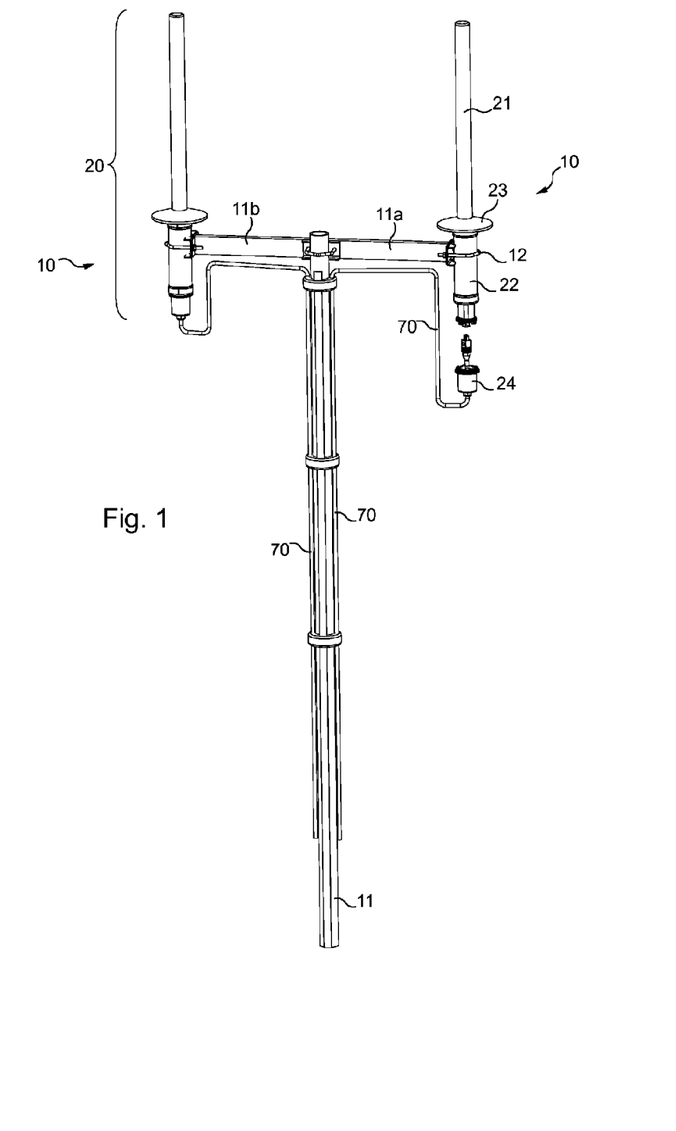
FIG. 1 is a perspective view of a mast equipped with two stations for receiving signals according to an embodiment of the invention.

As clearly shown in FIG. 1, the signal receiving station 10 is suitable for being fastened at the end of a mast 11.

By way of example, the mast 11 can reach a height of 20 to 30 m.

In the embodiment in FIG. 1, the mast 11 comprises two arms 11a, 11b at the upper end thereof, intended respectively for mounting two identical signal receiving stations 10.

Mounting two signal receiving stations 10 allows operational redundancy by providing an emergency receiving station in the case of malfunction, thus making it possible to defer a maintenance visit to the defective signal receiving station 10.

The signal receiving station 10 intended to be fastened at the end of a mast 11 will be described hereinafter.

The signal receiving station 10 comprises a housing 20 intended to be fastened to the mast 11.

In this embodiment, the housing 20 is held by a clamping collar 12 at one end of an arm 11a, 11b of the mast 11.

Any type of reliable, removable fastening may be suitable for mounting a housing 20 on the end of a mast 11.

Figure 2:
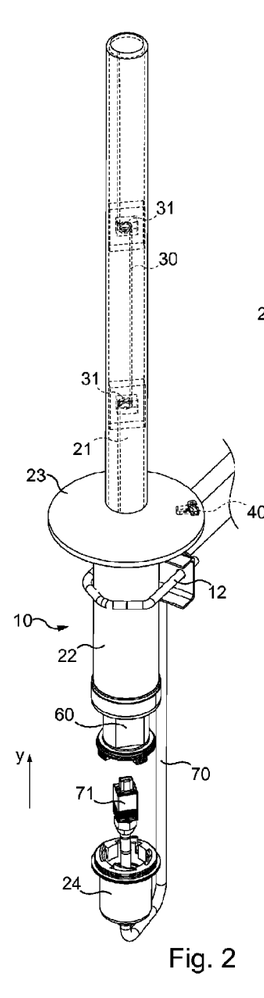
FIG. 2 is a partial perspective view of a mast equipped with a signal receiving station according to an embodiment of the invention.

As clearly shown in FIG. 2, the housing 20 comprises an antenna 30 for receiving ADS-B signals.

The antenna for receiving ADS-B signals is an omnidirectional antenna, having for example the form of a metal rod of sufficient length to capture the ADS-B signals broadcast by aircraft.

The antenna for receiving ADS-B signals is suitable for extending in a longitudinal direction Y that is substantially spatially vertical.

By way of non-limitative example, the antenna 30 for receiving ADS-B signals can have a length comprised between 30 and 90 cm, for example between 50 and 60 cm.

In this embodiment, non-limitatively, the antenna 30 for receiving ADS-B signals is formed from three vertical strands linked by coils 31.

The purpose of joining the vertical strands by the coils 31 is to de-phase the signal received by a quarter wavelength, making it possible to total the ADS-B signal levels received on the vertical strands.

Figure 3:
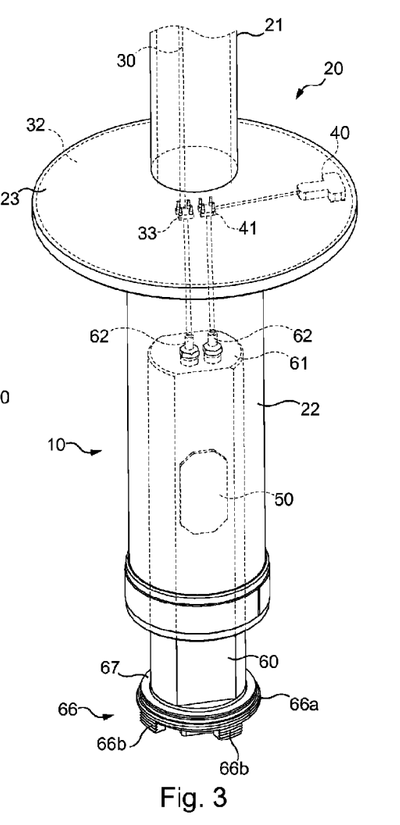
FIG. 3 is a partial perspective view of the signal receiving station in FIG. 2.

As shown in FIG. 3, in this embodiment, the antenna 30 for receiving ADS-B signals is mounted substantially at the centre of a ground plane 32.

Such a ground plane makes it possible in a known manner to improve the reception of the signals by the antenna 30 for receiving ADS-B signals.

In this embodiment, the ground plane 32 is in the shape of a disk, at the centre of which is fastened the antenna 30 for receiving ADS-B signals. The ground plane 32 is formed from an epoxy-copper printed circuit.

The antenna 30 for receiving ADS-B signals comprises at one connection end a coaxial output 33 making it possible to connect the antenna 30 for receiving ADS-B signals to a data processing system such as the one described hereinafter.

The housing 20 here mainly comprises two elongated tubular portions 21, 22 extending coaxially in a longitudinal direction parallel to the longitudinal direction Y of the ADS-B antenna 30.

An upper tubular portion 21 is designed to accommodate the antenna 30 for receiving ADS-B signals.

The tubular portions 21, 22 are coupled together using an enlarged portion 23 intended to accommodate the ground plane 32.

In this embodiment, the enlarged portion 23 is formed from two disk-shaped shells, each fastened to a tubular portion 21, 22 of the housing 20.

The tubular portions 21, 22 of the housing 20 and the enlarged portion 23 are produced for example from a rigid plastic material, for example from PVC, and are firmly fixed together in the signal receiving station 10.

The tubular portions 21, 22 and the enlarged portion 23 thus constitute a first part of the housing 20 intended to be fastened to the mast 11.

In this embodiment, fastening to the mast 11 is carried out by the clamping collar 12 fastened around a lower tubular portion 22 extending below the enlarged portion 23 when the signal receiving station 10 is mounted on the mast 11.

The signal receiving station 10 also comprises an antenna 40 for receiving GPS signals as shown in FIGS. 2 and 3.

In this embodiment, the antenna 40 for receiving GPS signals is fastened onto the ground plane 32.

In order to limit the interference caused by the antenna 40 for receiving GPS signals in relation to the reception of ADS-B signals, the antenna 40 for receiving GPS signals is preferably mounted at the periphery of the ground plane 32.

In this embodiment, in which the ground plane 32 is formed from a disk, the antenna 40 for receiving GPS signals is preferably arranged close to the periphery of the disk.

The antenna 40 for receiving GPS signals is thus accommodated with the ground plane 32 in the housing 20, here in the enlarged portion 23 of the housing 20.

As clearly shown in FIG. 3, the antenna 40 for receiving GPS signals comprises a coaxial output 41 intended for connecting the antenna 40 for receiving GPS signals to a data processing system described hereinafter.

The antenna 30 for receiving ADS-B signals and the antenna 40 for receiving GPS signals are directly connected inside the housing 20 to an electronic receiving and processing module 50.

Thus, the electronic module 50 for receiving and processing ADS-B signals and GPS signals is incorporated into the housing 20, in the signal receiving station 10 intended to be fastened at the top of the mast 11.

In practice, the electronic receiving and processing module 50 is produced from a printed circuit comprising all of the means for acquiring, amplifying and processing the signals received by the antennas for receiving ADS-B signals 30 and for receiving GPS signals 40.

In practice, the printed circuit board of the electronic receiving and processing module 50 can be produced on a board.

It can also be distributed over several printed circuit boards, allowing the separation of the functionalities of the electronic receiving and processing module 50.

Separation of the functionalities of the electronic receiving and processing module 50 makes it possible in particular to separate the part for receiving signals, which is more sensitive to interference, from the other parts for processing the signals.

The structure of such an electronic module 50 for receiving and processing signals need not be described in greater detail: it can be in the form of one or more printed circuit boards comprising the usual components for signal processing, in particular a microprocessor suitable for cooperating with a mass storage memory, of the micro SD type (Micro Secure Digital Card) and a RAM memory for storage of the calculation and processing software and the data acquired during processing.

The electronic receiving and processing module 50 is incorporated into a case 60 intended to be accommodated in the housing 20.

By way of example, the case 60 is produced from an aluminium block forming a solid structure accommodating the electronic receiving and processing module 50.

As clearly shown in FIG. 3, the case 60 comprises at a first end 61 two connectors 62 intended to connect the coaxial outputs 33, 41 respectively, of the antenna 30 for receiving ADS-B signals and the antenna 40 for receiving GPS signals, to the electronic receiving and processing module 50.

The connectors 62 can be SMB connectors (Sub Miniature Version B) conventionally used for connecting coaxial cables.

Figure 4:
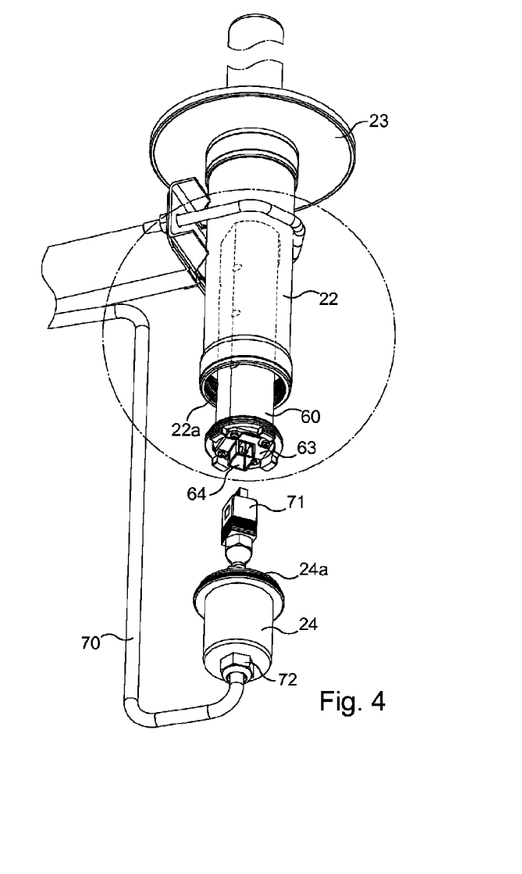
FIG. 4 is a truncated perspective view of the mast equipped with a signal receiving station from FIG. 2.

As clearly shown in FIG. 4, the case 60 comprises at a second end 63 an output connector forming a connector 64 for a network cable.

The connector 64 can typically be an RJ 45 (Registered Jack 45) connector used in network cabling of the Ethernet type.

The case 60 thus comprises a connector 64 suitable for connecting the electronic receiving and processing module 50 to a remote signal processing station (not shown).

In this embodiment, the case 60 is substantially in the form of a parallelepiped extending in the longitudinal direction Y, comprising the ends 61, 63 described above.

The case 60 is intended to be removably fastened inside the housing 20.

Thus, the electronic receiving and processing module 50 can be removed from the signal receiving station 10 with a view to replacement or repair thereof.

In order to enable access and removal of the case 60, the housing 20 comprises a second part 24 removably fastened onto the first part of the housing 20.

In this embodiment, the second part 24 is removably fastened to a free end of the lower tubular portion 22 of the first part of the housing 20.

The case 60 is intended to be accommodated in the housing 20 in the lower tubular portion 22 of the housing 20.

Thus, when the case 60 is accommodated in the housing 20, the case 60 extends under the ground plane 32 from which emerge the coaxial outputs 33, 41 of the two antennas 30, 40.

In this embodiment, as shown in FIG. 4, the second part 24 of the housing 20 comprises a threaded portion 24a intended to engage with a complementary threaded portion 22a of the lower tubular portion 22 of the housing 20.

The complementary threaded portion 22a is located close to the free end of the lower tubular portion 22, opposite the other end connected to the enlarged portion 23 of the housing 20.

The second part 24 of the housing 20 is suitable for the sealed mounting of a network cable 70 equipped at its end with a connector 71 intended to engage with the output connector 64 provided on the second end 63 of the case 60.

The network cable 70 is mounted conventionally in a sealed manner by means of a cable gland 72 via an opening arranged for the network cable 70 to pass through the second part 24 of the housing 20.

As shown diagrammatically in FIG. 1, the network cable 70 can be fastened at several points along the mast 11 in order to allow the return thereof to the ground and connection thereof with a remote ground station.

The second part 24 of the housing 20 forms a protective cover around the connection of the network cable 70.

In this embodiment in which the housing comprises two tubular portions 21, 22, the second part 24 of the housing is formed from a third tubular portion 24 extending in the prolongation of the lower tubular portion 22.

The length of the housing 20 can be comprised between 60 and 100 cm in the longitudinal direction Y.

Furthermore, in order to carry out the mounting of the case 60 inside the housing 20 in translation in the longitudinal direction Y and allow in particular the connection of the coaxial outputs 33, 41 respectively with the connectors 62, the case 60 comprises a male screw thread 66 mounted freely rotatable on the case 60 and mounted fixed in translation in the longitudinal direction Y of the case 60, corresponding to the longitudinal direction Y of the first part of the housing 20.

The first part of the housing 20 comprises a complementary female screw thread 22b, suitable for engaging with the male screw thread 66 of the case 60.

In this embodiment, the complementary female screw thread 22b is situated on an internal wall of the lower tubular portion 22 of the housing 20.

Thus, the case 60 can be mounted by screwing inside the lower tubular portion 22 of the housing 20. By means of the freely rotatable mounting of the male screw thread 66, screwing the case 60 has the effect of moving the case 60 in translation inside the housing 20 in order to make the connection by plugging the connectors 62 into the coaxial outputs 33, 41.

Foolproofing means can also be provided between the case 60 and the housing 20 in order to ensure correct positioning of the case around the longitudinal direction Y of the housing 20.

The foolproofing means can be conventional and produced by any types of complementary grooves or notches provided on the case 60 and the lower tubular portion 22 of the housing 20.

In this embodiment, non-limitatively, the case 60 comprises, close to the first end 61, a rib 68 intended to engage with a complementary groove (not shown) provided on an inner face of the housing 20, and more particularly on an inner face of the lower tubular portion 22 of the housing 20.

Figure 6:
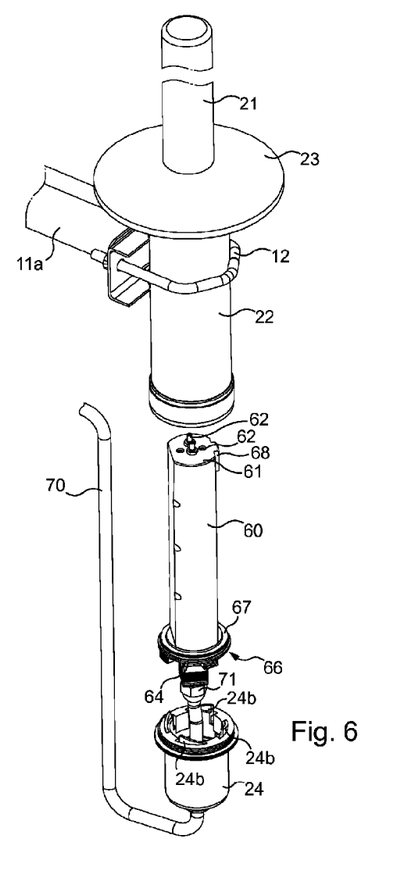
FIG. 6 is a truncated perspective view of the mast equipped with a signal receiving station from FIG. 2, showing the replacement and/or installation of an electronic module for receiving and processing signals.

Furthermore, as can be seen in FIG. 6, a seal 67 is provided in order to ensure sealing between the case 60 and the lower tubular portion 22 of the housing 20.

To this end, the lower tubular portion 22 of the housing 20 comprises on the inner face thereof a shoulder 22c, beyond the complementary female thread 22b.

The seal 67 is then compressed against this shoulder 22c during screw mounting of the case 60 into the lower tubular portion 22 of the housing 20.

Figure 5:
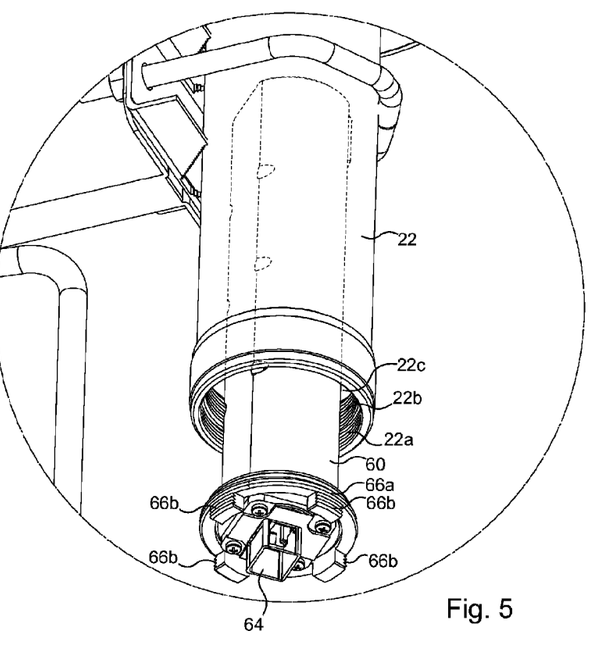
FIG. 5 is an enlarged perspective view of the detail A in FIG. 4.

As clearly shown in FIG. 5, the lower tubular portion 22 of the housing 20 thus comprises on an inner face the complementary female screw thread 22b, suitable for engaging with the male screw thread 66 of the case 60, and the complementary threaded portion 22a arranged at the lower end extremity of the lower tubular portion 22, suitable for engaging with the threaded portion 24a of the second part 24 of the housing 20.

As clearly shown in FIG. 5, the screw thread 66 mounted freely rotatable on the case 60 comprises in this embodiment a first threaded part 66a extending over the entire periphery of the case 60 and extending over a castellated part 66b to allow screwing by hand.

In this embodiment, the castellated part 66b comprises, non-limitatively, four castellations 66b bearing the male screw thread 66 and suitable for engaging with the complementary female screw thread 22b provided in the first part of the housing 20.

The four castellations 66b are symmetrically arranged on the periphery of the case 60.

Complementarily, the second part 24 of the housing 20 comprises catches 24b retractably mounted at one end of the second part 24 of the housing 20, intended to be removably fastened onto the first part of the housing 20.

In order to equip the second part 24 of the housing 20 with retractable catches 24b, any type of mechanism can be used allowing the catches 24b to be mounted in retracted position until an operator operates the mechanism in order to position the catches 24b in projecting position.

Similarly, in this embodiment, and as shown in FIG. 6, the second part 24 of the housing comprises four retractable catches 24b. The retractable catches 24b can occupy a retracted position in the second part 24 of the housing 20, or a projecting position as shown in FIG. 6, extending beyond the complementary threaded portion 24a of the second part 24 of the housing 20.

The retractable catches 24b are intended to engage with the castellations 66b of the case 60 in order to exert a force in the unscrewing direction for removing the case 60, in particular in the event of the seal 67 sticking.

An operation for replacing the electronic receiving and processing module 50 of the aforementioned signal receiving station 10 will now be described.

It will be noted that this operation for replacing the electronic receiving and processing module 50 can be carried out by an operator directly at height, with the signal receiving station 10 remaining fastened to the end of the mast 11.

Firstly, the operator unscrews the cable gland 72 from the second part 24 of the housing 20 in order to release the cable 70 and the second part 24 of the housing 20 is unscrewed from the lower tubular portion 22 of the housing 20.

The connection of the cable 70 to the connector 64 can thus be seen, the second part 24 of the housing 20 being able to slide along the cable 70.

The operator then proceeds to unscrew the case 60 mounted inside the housing 20.

To this end, if necessary, the retractable catches 24b are made to project in order to engage with the castellations 66b and facilitate unscrewing of the case 60 by exerting a rotational force on the male screw thread 66.

Finally, the case 60 can then be extracted by screwing manually.

It will be noted that in order to prevent the electronic receiving and processing module 50 accommodated inside the case 60 from falling, it remains permanently connected to the cable 70.

Once the case 60 is placed in the operator's bag, the latter disconnects the connector 71 from the connector 64 of the case 60.

It will be noted that at this stage, if the operator does not immediately replace the electronic receiving and processing module 50, it is possible to screw the second part 24 of the housing 20 back onto the first part of the housing 20 and thus to keep the assembly sealed while awaiting the replacement of the electronic receiving and processing module 50.

When the operator proceeds to connect a new case 60 accommodating a electronic receiving and processing module 50, he firstly connects the network cable 70 to the connector 64 of the case 60.

Then the operator positions the case 60 inside the first part of the housing, finding the appropriate position corresponding to the foolproofing means by pivoting the case 60.

Then he proceeds to screw in the case 60 by means of the male screw thread 66, mounted freely rotatable on the case 60, inside the lower tubular portion 22 of the first part of the case 20.

The translational movement of the case 60 in the longitudinal direction Y makes it possible to move the case 60 upwards inside the housing 20 and to connect the coaxial outputs 33, 41 of the antenna 30 for receiving ADS-B signals and the antenna 40 for receiving GPS signals.

The screw mounting of the case 60 continues until the seal 67 placed at the base of the case 60, close to the male thread 66, is tight.

Thus, sealed mounting can be carried out by manual screwing.

Once the case 60 is in place in the first part of the case 20, the operator screws the second part 24 of the housing 20 onto the lower tubular portion 22 of the housing 20, then closes the cable gland 72 in order to ensure sealing and to hold the network cable 70.

Thus, it is possible to mount and remove the electronic receiving and processing module 50 arranged inside the housing 20 fastened to the mast 11.

Maintenance and repair of the signal receiving station 10 are thereby facilitated.

The electronic receiving and processing module 50 comprises calculation means suitable for dating the ADS-B signals received and/or to verify the geographical position of the antenna 30 for receiving ADS-B signals from the GPS signals received by the antenna 40 for receiving GPS signals.

The signal receiving station 10 thus incorporates the electronic means for processing the ADS-B signal.

Installing the two antennas 30 for receiving ADS-B signals and 40 for receiving GPS signals together, as well as the absence of distance between these antennas and the electronic receiving and processing module 50 of the signals removes the risks of measurement errors, unlike the installations that use transmission cables between each antenna and the receiver thereof.

Thus, it is not necessary to measure the lengths of transmission cable, or the relative latitude, longitude and altitude positions of the antennas for the calculations of aircraft positioning by multilateration.

In fact, calculation by multilateration utilizes several antennas for receiving ADS-B signals. It is possible to calculate the precise position of the aircraft from dating the reception of the signals, and thus the difference in propagation time of the signals received from each antenna.

The signal receiving station described above makes it possible to obtain from all the 1090 Mhz signals (ADS-B signals and other signals originating from the transponders) data that are synchronized in time, allowing simplified positioning calculations by multilateration.

The electronic module 50 for receiving and processing signals can integrate more or less sophisticated signal processing functions.

In particular, the electronic receiving and processing module 50 can comprise means for generating messages according to the ASTERIX category 21 exchange standard, making it possible to define a format for the data conveyed with a view to their display on a control screen for air traffic control.

When the messages are generated conventionally by a ground station, this function can be implemented directly at the signal receiving station 10 placed at the top of a mast.

The signal receiving station 10 is thus similar to a ground station in its operation and makes it possible to integrate all of the regulatory requirements for message generation according to the ASTERIX standard, in particular ADS-B exchange (ASTERIX category 21) and supervision messages (ASTERIX 23).

In particular, the electronic receiving and processing module 50 makes it possible to verify and correct errors in the messages received, to monitor various parameters (temperature, humidity, etc.), to control the noise threshold as well as the number of traces received, an error percentage, a correction percentage, etc.

It also comprises means allowing the remote parametrisation and the updating and configuration of the signal receiving station 10.

The electronic receiving and processing module 50 can also have the functions of supervision, saving trace files, encrypting the data link, verifying the whole signal reception chain, etc.

In particular, the electronic receiving and processing module 50 can incorporate test means making it possible to verify the correct operation of the reception of ADS-B signals.

The electronic receiving and processing module 50 is thus suitable for generating an ADS-B test message, this message being injected by radiation into the input stage of the electronic receiving and processing module 50.

Thus, unlike the state of the art, the use of an exterior transmitter is avoided for sending a test ADS-B message to the antenna 30 for receiving ADS-B signals. Control of the whole of the signal reception chain is thus simplified, by analyzing the message at the output of the signal receiving station 10.

Of course, the present invention is not limited to the aforementioned embodiments.

In particular, the specific embodiment described above for the housing 20 intended for accommodating the antenna for receiving ADS-B signals, the antenna for receiving GPS signals and the electronic module for receiving and processing ADS-B signals and GPS signals is non-limitative.

The present invention extends to any type of structure and configuration of housing making it possible to produce, inside this housing, the connection of the antennas for receiving ADS-B signals and GPS signals to the electronic receiving and processing module.

The invention claimed is:

1. A signal receiving ground station for an ADS-B surveillance system utilized in air traffic control, comprising:
   a housing (20) configured to be fastened to a mast (11) configured to be anchored in the ground, said housing (20) comprising an antenna (30) for receiving ADS-B signals, an antenna (40) for receiving GPS signals, and an electronic module (50) configured to receive and process both ADS-B and GPS signals,
   said antennas (30) for receiving ADS-B signals and (40) for receiving GPS signals being connected to said receiving and processing electronic module (50) inside said housing (20), wherein said electronic receiving and processing module (50) is incorporated into a case (60) that is removably fastened inside said housing (20).

2. The receiving station according to claim 1, wherein the electronic module (50) for receiving and processing signals is configured for dating the ADS-B signals received and/or to verify the geographical position of said antenna (30) for receiving ADS-B signals from the GPS signals received.

3. The receiving station according to claim 2, wherein the electronic module (50) for receiving and processing signals generates messages according to the ASTERIX category 21 standard exchange system.

4. The receiving station according to claim 3, wherein the antenna (30) for receiving ADS-B signals is mounted in the centre of a ground plane (32) incorporated into said housing (20), and the antenna (40) for receiving GPS signals is fastened on said ground plane (32).

5. The receiving station according to claim 2, wherein the antenna (30) for receiving ADS-B signals is mounted in the centre of a ground plane (32) incorporated into said housing (20), and the antenna (40) for receiving GPS signals is fastened on said ground plane (32).

6. The receiving station according to claim 1, wherein said case (60) comprises two connectors (62) adapted to connect respectively to a coaxial output (33) of said antenna (30) for receiving ADS-B signals and to a coaxial output (41) of said antenna (40) for receiving GPS signals.

7. The receiving station according to claim 6, wherein said case (60) comprises a connector (64) for a network cable (70), adapted to connect said electronic receiving and processing module (50) to a remote signal processing station.

8. The receiving station according to claim 6, wherein said housing (20) comprises a first part (21, 22, 23) adapted to be fastened to a mast (11) and a second part (24) being removably fastened on said first part (21, 22, 23), said case (60) being accessible in said housing (20) when said second part (24) is removed from said first part (21, 22, 23).

9. The receiving station according to claim 6, wherein the antenna (30) for receiving ADS-B signals is mounted in the centre of a ground plane (32) incorporated into said housing (20), and the antenna (40) for receiving GPS signals is fastened on said ground plane (32).

10. The receiving station according to claim 1, wherein said case (60) comprises a connector (64) for a network cable (70), adapted to connect said electronic receiving and processing module (50) to a remote signal processing station.

11. The receiving station according to claim 10, wherein said housing (20) comprises a first part (21, 22, 23) adapted to be fastened to a mast (11) and a second part (24) being removably fastened on said first part (21, 22, 23), said case (60) being accessible in said housing (20) when said second part (24) is removed from said first part (21, 22, 23).

12. The receiving station according to claim 10, wherein the antenna (30) for receiving ADS-B signals is mounted in the centre of a ground plane (32) incorporated into said housing (20), and the antenna (40) for receiving GPS signals is fastened on said ground plane (32).

13. The receiving station according to claim 1, wherein said housing (20) comprises a first part (21, 22, 23) adapted to be fastened to a mast (11) and a second part (24) being removably fastened on said first part (21, 22, 23), said case (60) being accessible in said housing (20) when said second part (24) is removed from said first part (21, 22, 23).

14. The receiving station according to claim 13, wherein said first part (21, 22, 23) of the housing (20) comprises a female screw thread (22*b*) adapted to engage with a male screw thread (66) mounted freely rotatable on said case (60) and mounted fixed in translation in a longitudinal direction (Y) of said case (60) and of the first part (21, 22, 23) of the housing (20).

15. The receiving station according to claim 1, wherein the antenna (30) for receiving ADS-B signals is mounted in the centre of a ground plane (32) incorporated into said housing (20), and the antenna (40) for receiving GPS signals is fastened on said ground plane (32).

16. The receiving station according to claim 15, wherein said antenna (40) for receiving GPS signals is mounted at the periphery of said ground plane (32).

* * * * *